United States Patent
Young et al.

(10) Patent No.: US 7,021,707 B2
(45) Date of Patent: Apr. 4, 2006

(54) VEHICLE OCCUPANT SENSING SYSTEM HAVING A LOW PROFILE SENSOR ASSEMBLY

(75) Inventors: Oliver Young, Grosse Pointe Farms, MI (US); John F. Nathan, White Lake Township, MI (US); Christopher T. Ricard, Rochester, MI (US); Mark Sebby, Brighton, MI (US)

(73) Assignee: Lear Corporation, Southfield, MI (US)

( * ) Notice: Subject to any disclaimer, the term of this patent is extended or adjusted under 35 U.S.C. 154(b) by 81 days.

(21) Appl. No.: 10/748,536

(22) Filed: Dec. 30, 2003

(65) Prior Publication Data

US 2004/0263344 A1   Dec. 30, 2004

Related U.S. Application Data

(63) Continuation-in-part of application No. 10/606,649, filed on Jun. 26, 2003.

(51) Int. Cl.
*A47C 31/12* (2006.01)
*A47C 7/62* (2006.01)

(52) U.S. Cl. .............................. 297/217.2; 297/217.3; 297/463.2; 280/735

(58) Field of Classification Search ............. 297/217.2, 297/217.3, 463.2; 280/735
See application file for complete search history.

(56) References Cited

U.S. PATENT DOCUMENTS

| | | | |
|---|---|---|---|
| 5,404,128 A | 4/1995 | Ogino et al. ............. 340/425.5 |
| 5,413,378 A | 5/1995 | Steffens, Jr. et al. ........ 280/735 |
| 5,474,327 A | 12/1995 | Schousek .................... 280/735 |
| 5,485,000 A | 1/1996 | Schneider ................... 235/494 |
| 5,570,903 A | 11/1996 | Meister et al. .............. 280/735 |
| 5,594,222 A | 1/1997 | Caldwell .................... 200/600 |
| 5,653,462 A | 8/1997 | Breed et al. ................ 280/735 |
| 5,694,320 A | 12/1997 | Breed .................. 364/424.055 |
| 5,731,781 A | 3/1998 | Reed ........................... 342/135 |
| 5,739,757 A | 4/1998 | Gioutsos .................... 340/667 |
| 5,748,473 A | 5/1998 | Breed et al. .......... 364/424.055 |
| 5,810,392 A | 9/1998 | Gagnon ...................... 280/735 |
| 5,822,707 A | 10/1998 | Breed et al. .................. 701/49 |
| 5,829,782 A | 11/1998 | Breed et al. ................ 280/735 |
| 5,835,613 A | 11/1998 | Breed et al. ................ 382/100 |
| 5,848,802 A | 12/1998 | Breed et al. ................ 280/735 |
| 5,877,677 A | 3/1999 | Fleming et al. ............. 340/436 |
| 5,890,758 A | 4/1999 | Pone et al. ................... 297/15 |
| 5,901,978 A | 5/1999 | Breed et al. ................ 280/735 |
| 5,931,254 A | 8/1999 | Loraas et al. ............... 180/272 |
| 5,931,527 A | 8/1999 | D'Onofrio et al. ......... 297/146 |
| 5,943,295 A | 8/1999 | Varga et al. .................. 367/99 |
| 5,954,398 A | 9/1999 | Namba et al. .............. 297/257 |

(Continued)

FOREIGN PATENT DOCUMENTS

EP   0 689 967 A1   3/1996
WO   WO 98/41424     3/1997

*Primary Examiner*—Rodney B. White
(74) *Attorney, Agent, or Firm*—Bliss McGlynn, P.C.; Bill Panagos

(57) ABSTRACT

A low profile sensor assembly for use in a vehicle occupant sensing system that comprises a base, an upper slide member, and at least one intermediate guide member. Also disclosed is a low profile sensor assembly for use in a vehicle occupant sensing system that comprises a base with an outer step and a receptacle, and the low profile sensor assembly also comprises an upper slide member with a lower flange and a retainer. The outer step is adapted to accept the lower flange, and the receptacle is adapted to accept the retainer. The intermediate guide member, the outer step, and the receptacle each allow the respective upper slide member to move further toward the base. Thus, when the low profile sensor assembly is incorporated into a vehicle seat assembly, the low profile sensor assembly is less likely to detrimentally affect the comfort level of the vehicle seat assembly.

5 Claims, 4 Drawing Sheets

U.S. PATENT DOCUMENTS

| | | | |
|---|---|---|---|
| 5,971,432 A | 10/1999 | Gagnon et al. | 280/735 |
| 5,975,612 A | 11/1999 | Macey et al. | 296/66 |
| 6,012,007 A | 1/2000 | Fortune et al. | 701/45 |
| 6,020,812 A | 2/2000 | Thompson et al. | 340/438 |
| 6,027,138 A | 2/2000 | Tanaka et al. | 280/735 |
| 6,030,038 A | 2/2000 | Namba et al. | 297/257 |
| 6,039,139 A | 3/2000 | Breed et al. | 180/271 |
| 6,039,344 A * | 3/2000 | Mehney et al. | 280/735 |
| 6,043,743 A | 3/2000 | Saito et al. | 340/562 |
| 6,045,405 A | 4/2000 | Geltsch et al. | 439/620 |
| 6,056,079 A | 5/2000 | Cech et al. | 180/273 |
| 6,059,358 A | 5/2000 | Demick et al. | 297/188.04 |
| 6,078,854 A | 6/2000 | Breed et al. | 701/49 |
| 6,079,763 A | 6/2000 | Clemente | 296/65.05 |
| 6,081,757 A | 6/2000 | Breed et al. | 701/45 |
| 6,087,598 A * | 7/2000 | Munch | 280/735 X |
| 6,088,640 A | 7/2000 | Breed | 701/45 |
| 6,089,641 A | 7/2000 | Mattarella et al. | 296/64 |
| 6,092,838 A * | 7/2000 | Walker | 280/735 |
| 6,101,436 A | 8/2000 | Fortune et al. | 701/45 |
| 6,102,463 A | 8/2000 | Swanson et al. | 296/37.15 |
| 6,116,639 A | 9/2000 | Breed et al. | 280/735 |
| 6,129,168 A * | 10/2000 | Lotito et al. | 280/735 X |
| 6,129,404 A | 10/2000 | Mattarella et al. | 296/65.09 |
| 6,134,492 A | 10/2000 | Breed et al. | 701/49 |
| 6,138,067 A | 10/2000 | Cobb et al. | 701/45 |
| 6,141,432 A | 10/2000 | Breed et al. | 382/100 |
| 6,168,198 B1 | 1/2001 | Breed et al. | 280/735 |
| 6,186,537 B1 | 2/2001 | Breed et al. | 280/738 |
| 6,220,627 B1 | 4/2001 | Stanley | 280/735 |
| 6,234,519 B1 | 5/2001 | Breed | 280/735 |
| 6,234,520 B1 | 5/2001 | Breed et al. | 280/735 |
| 6,242,701 B1 | 6/2001 | Breed et al. | 177/144 |
| 6,250,671 B1 | 6/2001 | Osmer et al. | 280/735 |
| 6,250,672 B1 | 6/2001 | Ryan et al. | 280/735 |
| 6,253,134 B1 | 6/2001 | Breed et al. | 701/49 |
| RE37,260 E | 7/2001 | Varga et al. | 367/99 |
| 6,254,127 B1 | 7/2001 | Breed et al. | 280/735 |
| 6,270,116 B1 | 8/2001 | Breed et al. | 280/735 |
| 6,279,946 B1 | 8/2001 | Johnson et al. | 280/734 |
| 6,283,503 B1 | 9/2001 | Breed et al. | 280/735 |
| 6,323,444 B1 | 11/2001 | Aoki | 177/144 |
| 6,324,453 B1 | 11/2001 | Breed et al. | 701/45 |
| 6,325,414 B1 | 12/2001 | Breed et al. | 280/735 |
| 6,330,501 B1 | 12/2001 | Breed et al. | 701/49 |
| 6,342,683 B1 | 1/2002 | Aoki et al. | 177/144 |
| 6,353,394 B1 | 3/2002 | Maeda et al. | 340/667 |
| 6,393,133 B1 | 5/2002 | Breed et al. | 382/100 |
| 6,394,490 B1 | 5/2002 | Osmer et al. | 280/735 |
| 6,397,136 B1 | 5/2002 | Breed et al. | 701/45 |
| 6,407,347 B1 | 6/2002 | Blakesley | 177/144 |
| 6,412,813 B1 | 7/2002 | Breed et al. | 280/735 |
| 6,416,080 B1 | 7/2002 | Gillis et al. | 280/735 |
| 6,419,315 B1 * | 7/2002 | Hiemstra | 297/216.1 |
| 6,422,595 B1 | 7/2002 | Breed et al. | 280/735 |
| 6,442,465 B1 | 8/2002 | Breed et al. | 701/45 |
| 6,442,504 B1 | 8/2002 | Breed et al. | 702/173 |
| 6,445,988 B1 | 9/2002 | Breed et al. | 701/45 |
| 6,452,870 B1 | 9/2002 | Breed et al. | 367/99 |
| 6,457,545 B1 | 10/2002 | Michaud et al. | 180/272 |
| 6,474,739 B1 | 11/2002 | Lagerweij | 297/341 |
| 6,476,514 B1 | 11/2002 | Schondorf | 307/10.1 |
| 6,506,069 B1 | 1/2003 | Babala et al. | 439/248 |
| 6,605,877 B1 | 8/2003 | Patterson et al. | 307/10.1 |
| 6,609,054 B1 | 8/2003 | Wallace | 701/45 |
| 6,677,539 B1 * | 1/2004 | Miura et al. | 280/735 X |
| 6,820,896 B1 * | 11/2004 | Norton | 280/735 |
| 2002/0003345 A1 | 1/2002 | Stanley et al. | 280/735 |
| 2002/0056975 A1 | 5/2002 | Yoon et al. | 280/735 |
| 2002/0079728 A1 | 6/2002 | Tame | 297/344.1 |
| 2002/0098730 A1 | 7/2002 | Babala et al. | 439/248 |
| 2002/0105221 A1 * | 8/2002 | Wolfe | 297/463.2 |
| 2002/0195807 A1 | 12/2002 | Ishida | 280/735 |
| 2003/0040858 A1 | 2/2003 | Wallace | 701/45 |
| 2003/0071479 A1 | 4/2003 | Schaller et al. | 296/136 |
| 2003/0085060 A1 * | 5/2003 | Becker et al. | 280/735 X |
| 2003/0090133 A1 | 5/2003 | Nathan et al. | 297/217.3 |
| 2003/0106723 A1 | 6/2003 | Thakur et al. | 177/144 |
| 2003/0111276 A1 | 6/2003 | Kajiyama | 177/144 |
| 2003/0164715 A1 | 9/2003 | Lester | 324/661 |
| 2003/0171036 A1 | 9/2003 | Aujla et al. | 439/660 |
| 2003/0189362 A1 | 10/2003 | Lichtinger et al. | 297/217.3 |
| 2003/0196495 A1 | 10/2003 | Saunders et al. | 73/862.041 |
| 2003/0220766 A1 | 11/2003 | Saunders et al. | 702/173 |
| 2004/0160110 A1 * | 8/2004 | Enomoto et al. | 297/452.5 |
| 2004/0232751 A1 * | 11/2004 | Basir et al. | 297/338 |
| 2004/0262957 A1 * | 12/2004 | Young et al. | 297/217.3 |

* cited by examiner

VEHICLE OCCUPANT SENSING SYSTEM HAVING A LOW PROFILE SENSOR ASSEMBLY

CROSS-REFERENCE TO RELATED APPLICATIONS

This application is a continuation-in-part of U.S. Ser. No. 10/606,649, entitled "Encapsulated Spring Sensor Assembly" and filed Jun. 26, 2003.

BACKGROUND OF THE INVENTION

1. Field of the Invention

The present invention relates generally to vehicle occupant sensing systems and, more particularly, to a vehicle occupant sensing system having a low profile sensor assembly.

2. Description of the Related Art

Automotive vehicles employ seating systems that accommodate the passengers of the vehicle. The seating systems include restraint systems that are calculated to restrain and protect the occupants in the event of a collision. The primary restraint system commonly employed in most vehicles today is the seatbelt. Seatbelts usually include a lap belt and a shoulder belt that extends diagonally across the occupant's torso from one end of the lap belt to a mounting structure located proximate to the occupant's opposite shoulder.

In addition, automotive vehicles may include supplemental restraint systems. The most common supplemental restraint system employed in automotive vehicles today is the inflatable airbag. In the event of a collision, the airbags are deployed as an additional means of restraining and protecting the occupants of the vehicle. Originally, the supplemental inflatable restraints (airbags) were deployed in the event of a collision whether or not any given seat was occupied. These supplemental inflatable restraints and their associated deployment systems are expensive and over time this deployment strategy was deemed not to be cost effective. Thus, there became a recognized need in the art for a means to selectively control the deployment of the airbags such that deployment occurs only when the seat is occupied.

Partially in response to this need, vehicle safety systems have been proposed that include vehicle occupant sensing systems capable of detecting whether or not a given seat is occupied. The systems act as a switch in controlling the deployment of a corresponding air bag. As such, if the occupant sensing device detects that a seat is unoccupied during a collision, it can prevent the corresponding air bag from deploying, thereby saving the vehicle owner the unnecessary cost of replacing the expended air bag.

Furthermore, many airbag deployment forces and speeds have generally been optimized to restrain one hundred eighty pound males because the one hundred eighty pound male represents the mean average for all types of vehicle occupants. However, the airbag deployment force and speed required to restrain a one hundred eighty pound male exceeds that which are required to restrain smaller occupants, such as some females and small children. Thus, there became a recognized need in the art for occupant sensing systems that could be used to selectively control the deployment of the airbags when a person below a predetermined weight occupies the seat.

Accordingly, other vehicle safety systems have been proposed that are capable of detecting the weight of an occupant. In one such air bag system, if the occupant's weight falls below a predetermined level, then the system can suppress the inflation of the air bag or will prevent the air bag from deploying at all. This reduces the risk of injury that the inflating air bag could otherwise cause to the smaller-sized occupant.

Also, many airbag deployment forces and speeds have generally been optimized to restrain a person sitting generally upright towards the back of the seat. However, the airbag deployment force and speed may inappropriately restrain a person sitting otherwise. Thus, there became a recognized need in the art for a way to selectively control the deployment of an airbag depending on the occupant's sitting position.

Partially in response to this need, other vehicle safety systems have been proposed that are capable of detecting the position of an occupant within a seat. For example, if the system detects that the occupant is positioned toward the front of the seat, the system will suppress the inflation of the air bag or will prevent the air bag from deploying at all. This reduces the risk of injury that the inflating air bag could otherwise cause to the occupant.

It can be appreciated that these occupant sensing systems provide valuable data, allowing the vehicle safety systems to function more effectively to reduce injuries to vehicle occupants.

One necessary component of each of the known systems discussed above includes some means for sensing the presence of the vehicle occupant in the seat. One such means may include a sensor device supported within the lower seat cushion of the vehicle seat. For example, U.S. published patent application having U.S. Ser. No. 10/249,527 and Publication No. US2003/0196495 A1 filed in the name of Saunders et al. discloses a method and apparatus for sensing seat occupancy including a sensor/emitter pair that is supported within a preassembled one-piece cylinder-shaped housing. The housing is adapted to be mounted within a hole formed in the seat cushion and extending from the B-surface toward the A-surface of the seat cushion. The sensor/emitter pair supported in the housing includes an emitter that is mounted within the seat cushion and spaced below the upper or A-surface of the seat cushion. In addition, the sensor is also supported by the housing within the seat cushion but spaced below the emitter. The cylindrical housing is formed of a compressible, rubber-like material that is responsive to loads placed on the upper surface of the seat cushion. The housing compresses in response to a load on the seat cushion. The load is detected through movement of the emitter toward the sensor as the housing is compressed. The housing is sufficiently resilient to restore the emitter to full height when no load is applied to the upper surface of the seat cushion. The Saunders et al. system also includes a processor for receiving the sensor signals and interpreting the signals to produce an output to indicate the presence of an occupant in the seat.

While the Saunders et al. occupant seat sensing system teaches a sensor/emitter pair that may sense the presence of a vehicle seat occupant, it suffers from certain disadvantages associated with the fact that it is mounted within the seat cushion of the vehicle seat. For example, vehicle seat cushions typically employ a foam or other cushiony material of a predetermined thickness. The thickness of this material is preferably calculated to provide adequate comfort for the occupant. However, with the housings of the sensor/emitter pairs mounted within the cushion, the occupant may feel one or more of the housings through the seat cushion. This is especially true over time as the seat cushion becomes worn. Furthermore, while the compressible, rubber-like housing taught by Saunders et al. is generally responsive to forces extending along the length of its axis, is also subject to transverse or "shear" forces acting through the seat cushion. Thus, the housing can be deformed in an irregular manner resulting in false readings generated by the sensor/emitter pair.

Therefore, there is an ongoing need in the art for a vehicle occupant sensing system including a low profile sensor assembly that can provide suitable occupant sensing capabilities and yet be positioned outside the envelope defined by the lower seat cushion without detrimentally affecting the comfort level of the seat. Furthermore, there is a need in the art for such a vehicle occupant sensing system that is resistant to shear forces and otherwise constructed to respond in a single axis of movement.

SUMMARY OF THE INVENTION

Accordingly, the present invention is a vehicle occupant sensing system including a low profile sensor assembly. The low profile sensor assembly has a housing including a base, an upper slide member, and at least one intermediate guide member disposed between the upper slide member and the base. The upper slide member and the at least one intermediate guide member are supported for movement toward and away from the base. Also, the vehicle occupant sensing system includes a sensor operatively fixed relative to at least one of the upper slide member and the base. The sensor is operable to detect movement of the upper slide member toward and away from the base.

In another aspect, the present invention is a vehicle occupant sensing system including a low profile sensor assembly. The low profile sensor assembly has a housing including a base and an upper slide member with a lower flange and a retainer. The upper slide member is supported for movement toward and away from the base. Also, the base includes an outer step which is adapted to accept the lower flange of the upper slide member. The base further includes a receptacle which is adapted to accept the retainer when the upper slide member has moved toward the base. The vehicle occupant sensing system also includes a sensor operatively fixed relative to at least one of the upper slide member and the base. The sensor is operable to detect movement of the upper slide member toward and away from the base.

Both embodiments of the vehicle occupant sensing system may be employed in a vehicle seat to detect a condition of the vehicle seat.

The intermediate guide member, the outer step, and the receptacle each allow the upper slide member to slide farther into the base for increased collapsibility. As such, when the sensor assemblies are incorporated into a vehicle seat, the vehicle occupant is less likely to feel the sensor assemblies through the lower seat cushion. Thus, the low profile sensor assemblies are less likely to detrimentally affect the comfort level of the vehicle seat assembly in which they are incorporated.

Other features and advantages of the present invention will be readily appreciated, as the same becomes better understood, after reading the subsequent description taken in conjunction with the accompanying drawings.

DETAILED DESCRIPTION OF THE PREFERRED EMBODIMENT(S)

Figure 1:
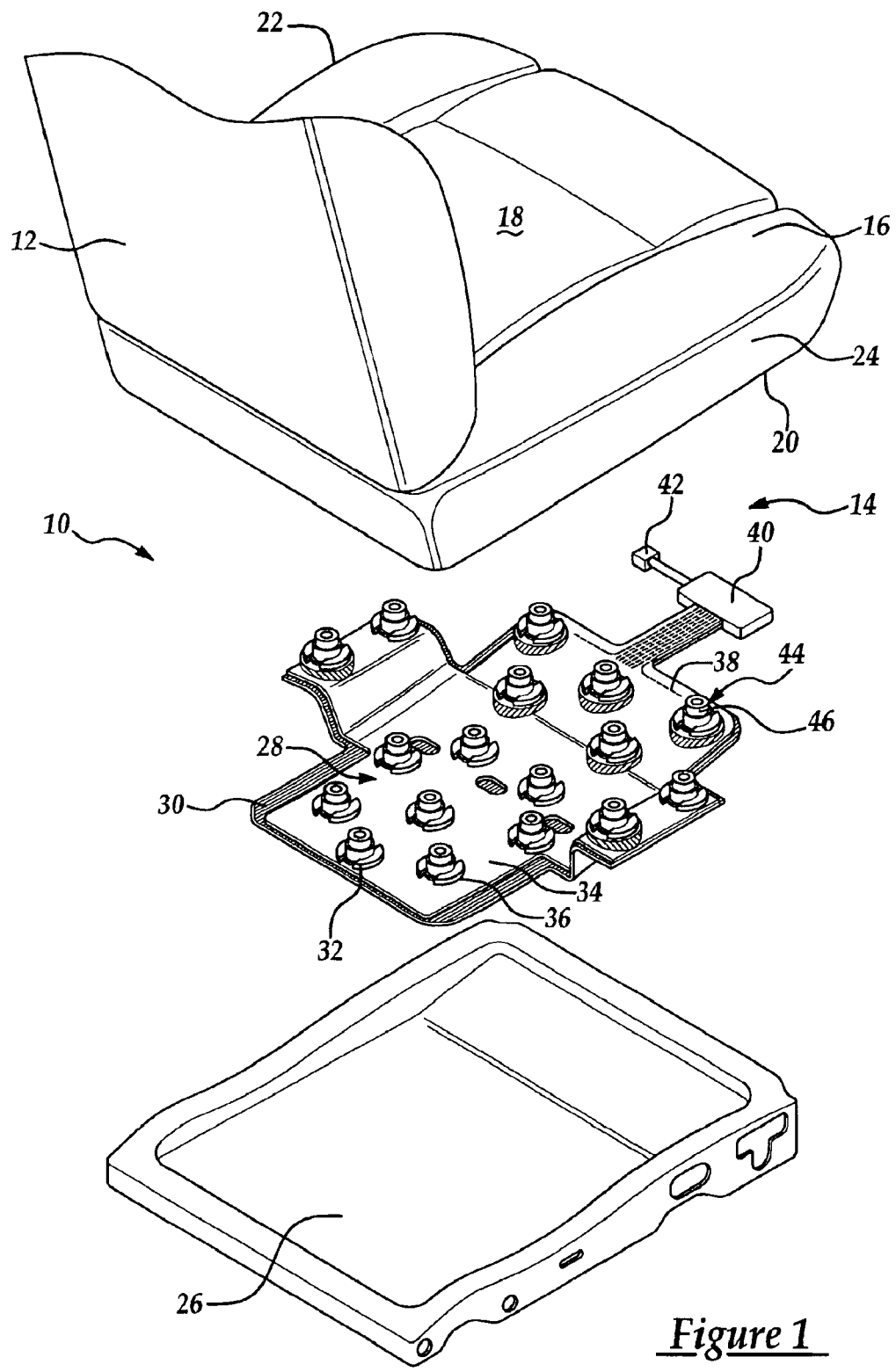
FIG. 1 is an exploded view of a vehicle seat assembly incorporating a vehicle occupant sensing system having a plurality of low profile sensor assemblies.

Referring now to the drawings, where like numerals are used to designate like structure throughout the figures, an exploded view of one embodiment of the vehicle seat assembly of the present invention is generally indicated at 10 in FIG. 1. The vehicle seat assembly 10 includes a seat back, generally indicated at 12, and a lower seat assembly, generally indicated at 14. The lower seat assembly 14 has a seat cushion 16 that defines an upper surface 18, and a lower surface 20 that is spaced from the upper surface 18. The upper surface 18 of the seat cushion 16 may be referred to as the "A-surface" and the lower surface 20 may be referred to as the "B-surface." The seat cushion 16 also defines an inboard side 22 and an outboard side 24. When an occupant (not shown) is supported on the lower seat assembly 14, the weight of the occupant will apply an axial load directed generally through the upper surface 18 of the seat cushion 16 toward the lower surface 20. Although the weight of the occupant will induce an axial as well as shear forces in the seat cushion 16, those having ordinary skill in the art will recognize that the primary load path of the occupant's weight will be substantially vertical from the upper surface 18 toward the lower surface 20, through the seat cushion 16.

The lower seat assembly 14 also includes a seat pan, generally indicated at 26. The seat pan 26 is generally disposed beneath the lower surface 18 so as to support the seat cushion 16. In turn, the seat pan 26 is operatively supported relative to the floor of the vehicle using any suitable structure of the type commonly known in the art, such as a seat track (not shown). In addition, the vehicle seat assembly 10 includes a vehicle occupant sensing system, generally indicated at 28. The vehicle occupant sensing system 28 is used for detecting a condition of the vehicle seat assembly 10, such as whether or not the vehicle seat assembly 10 is occupied, whether the occupant is above or below a certain weight requirement, or whether the occupant is sitting in a certain position.

The sensing system 28 includes a circuit carrier tray, generally indicated at 30, that is supported by the seat pan 26. The circuit carrier tray 30 includes a plurality of resilient attachment tabs 32 extending upward toward the lower surface 20 of the lower seat cushion 16. Each attachment tab 32 is shaped like a partial ring that extends upward from the tray 30. In the preferred embodiment illustrated in FIG. 1, the attachment tabs 32 are arranged into mirror-image pairs spaced intermittently about the tray 30. The tray 30 supports components of the vehicle occupant sensing system 28 as will be described in greater detail below.

The vehicle occupant sensing system 28 also includes a circuit carrier 34, which is disposed adjacent the lower surface 20 of the seat cushion 16. The tray 30 supports the circuit carrier 34, and the circuit carrier 34 includes a plurality of cutouts 36 each having a shape corresponding to the shape of the attachment tabs 32 of the tray 30 such that the tabs 32 can extend upward through the circuit carrier 34.

The vehicle occupant sensing system 28 also includes an electric circuit 38, which is supported by the circuit carrier 34. Specifically, the circuit carrier 34 is made of a thin nonconductive and corrosion-resistant material, and it encapsulates known electrical components that form the electric circuit 38. For instance, in one embodiment, a flexible printed circuit forms the circuit carrier 34 and electric circuit 38.

The circuit 38 is electrically connected to a controller schematically illustrated at 40. As described in greater detail below, the electric circuit 38 carries electric signals generated by the vehicle occupant sensing system 28 to the controller 40. The controller 40 is electrically attached to a restraint system, schematically illustrated at 42. The restraint system 42 can be of many types, such as an air bag system, and the controller 40 sends output to the restraint system 42 based on the signals delivered by the electric circuit 38. Although an airbag restraint system is discussed here, one having ordinary skill in the art will recognize that the type of restraint system 42 connected to the controller 40 does not limit the scope of the present invention.

The system 28 also includes a plurality of low profile sensor assemblies 44 that are supported by the tray 30, below the lower surface 20 of the seat cushion 16. In one embodiment not shown, the lower surface 20 includes a plurality of depressions, and each of the low profile sensor assemblies 44 are spaced according to a corresponding depression formed in the lower surface 20 of the lower seat cushion 16. As will be discussed in greater detail below, the sensor assemblies 44 have a relatively low profile and can collapse in a more compact manner than similar sensor assemblies of the prior art. Advantageously, these low profile sensor assemblies 44 allow an occupant to sit more comfortably upon the vehicle seat 10.

Also, a sensor, generally indicated at 46, is operatively fixed relative to each of the low profile sensor assemblies 32. The sensor 46 is in electrical communication with the electric circuit 38. The low profile sensor assemblies 44 each cooperatively operate with the associated sensor 46 to detect a condition of the vehicle seat 10 as will be described in greater detail below. For example, the low profile sensor assemblies 44 and sensor 46 can operate to detect that the vehicle seat 10 is unoccupied, is occupied by a person of a particular weight, or is occupied by a person sitting in a particular position.

Figure 2:
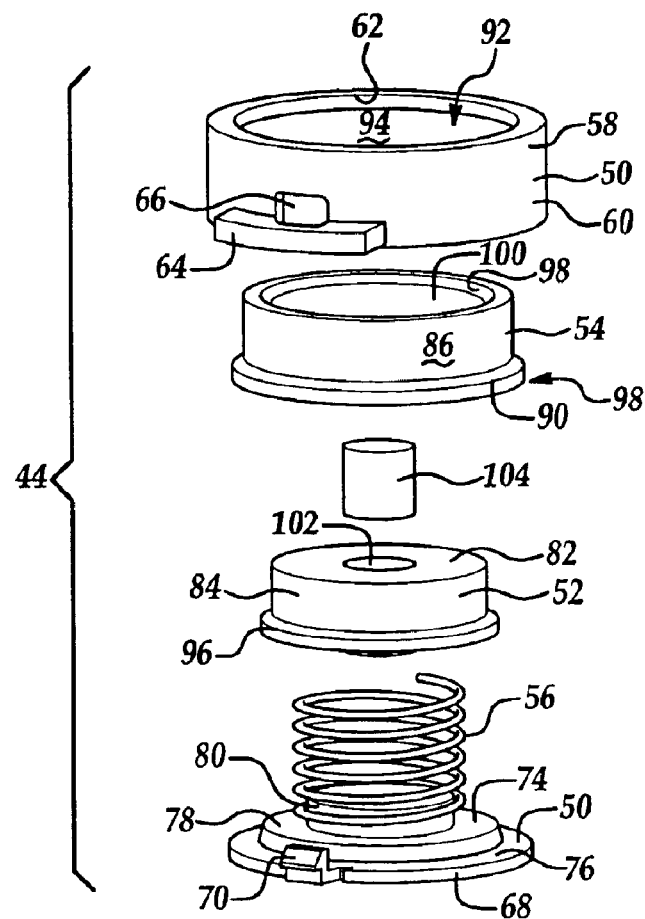
FIG. 2 is an exploded view of one embodiment of the low profile sensor assembly suitable for use in the vehicle occupant sensing system illustrated in FIG. 1.
Figure 3:
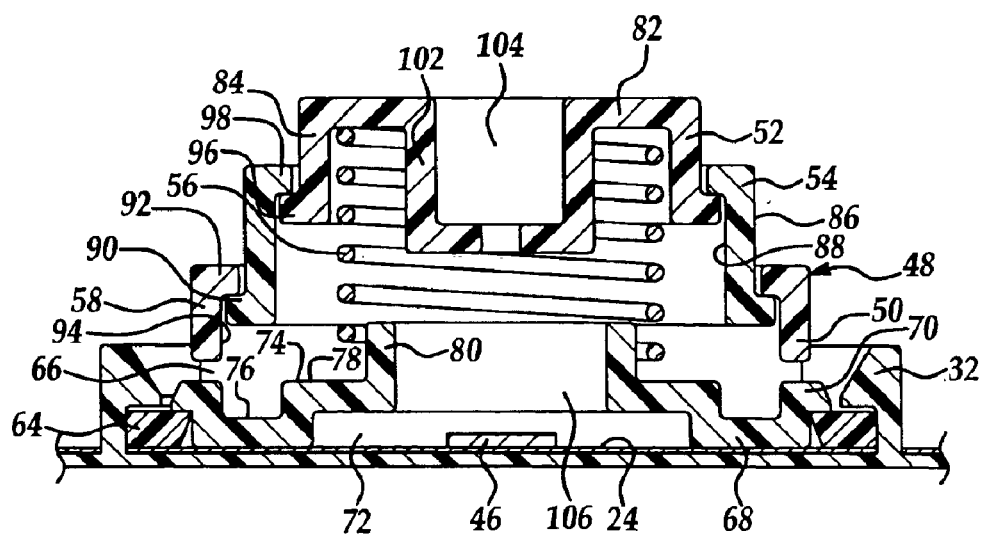
FIG. 3 is a cross-sectional side view of the low profile sensor assembly of FIG. 2 shown in a free state.
Figure 4:
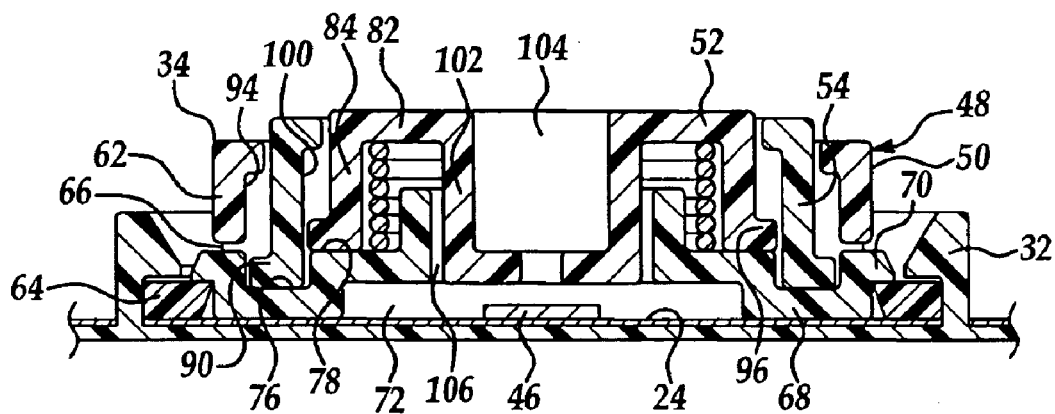
FIG. 4 is a cross-sectional side view of the low profile sensor assembly of FIG. 2 shown in a compressed state.

One embodiment of the low profile sensor assembly is generally indicated at 44 and shown in greater detail in FIGS. 2–4. The low profile sensor assembly 44 generally includes a housing 48, having a base 50, an upper slide member 52, and an intermediate guide member 54 disposed between the upper slide member 52 and the base 50. The upper slide member 52 and the intermediate guide member 54 are both supported for movement toward and away from the base 50. A biasing member 56 acts to bias the upper slide member 52 and intermediate guide member 54 away from the base 50 as will be described in greater detail below.

In the preferred embodiment illustrated in these figures, the base 50 includes a base guide 58, which is shaped like a hollow tube so as to define a wall 60 with a bore 62 extending axially therethrough. On an outside surface of the wall 60, two hold-down flanges 64 project radially outward, spaced 180° apart from each other. An aperture 66 extends radially through the wall 60 directly above each hold-down flange 64.

The base 50 also includes a retainer 68, which is substantially disc-shaped and is attached to one terminal end of the base guide 58. Two resilient tabs 70 extend radially and upward from an outer circumferential edge of the retainer 68. The tabs 70 are spaced 180° apart from each other. To connect the retainer 68 and the base guide 58, the retainer 68 moves axially into the bore 62 of the base guide 58 such that the tabs 70 of the retainer 68 snap into the apertures 66 of the base guide 58.

As shown in FIGS. 3 and 4, the base 50 can be attached to the annular attachment tabs 32 that extend upwardly from the tray 30. Specifically, the hold-down flanges 64 of the base guide 58 can be positioned under the annular attachment tabs 32 of the tray 30 such that the annular attachment tabs 32 retain the hold-down flanges 64. In one embodiment, to attach the base 50 to the tray 30, the bottom surface of the base 50 is positioned on the tray 30 such that the hold-down flanges 64 and the annular attachment tabs 32 are not aligned. Then, the base 50 is rotated about its axis until the hold-down flanges 64 move completely under the annular attachment tabs 32. In another embodiment, the hold-down flanges 64 and the annular attachment tabs 32 are aligned, and the base 50 is moved axially toward the tray 30 such that the annular attachment tabs 32 bend back and snap over the hold-down flanges 64.

Also, an annular void 72 is formed near the axial center of the base 50. In one embodiment shown in FIGS. 3 and 4, the sensor 46 is a Hall effect sensor attached to the circuit carrier 34 between each pair of tabs 32 of the tray 30. Electrical attachment between the sensor 46 and the circuit carrier 34 can be accomplished in the manner described in applicant's co-pending application, Ser. No. 10/748,514, entitled "Vehicle Occupant Sensing System and Method of Electrically Attaching a Sensor to an Electrical Circuit," which is hereby incorporated in its entirety by reference. When the base 50 is attached to the tray 30, the annular void 72 provides clearance for the sensor 46.

The retainer 68 has a top surface 74, which is stepped so as define a plurality of concentric features. First, the stepped top surface 74 defines an outer step 76 formed on the outer radial portion of the top surface 74 of the retainer 68. Next, the stepped top surface 74 defines an inner platform 78 formed radially inboard of the outer step 76. As shown in FIGS. 3 and 4, the inner platform 78 extends axially upward from the outer step 76. Finally, nearest the center of the stepped top surface 74 is a ring 80 extending upward from the inner platform 78.

As noted above, the low profile sensor assembly 44 includes an upper slide member 52. The upper slide member 52 includes an upper disc portion 82 and a support wall 84 extending axially downward from the outer circumference of the upper disc portion 82. The support wall 84 has a smaller diameter than the diameter of the intermediate guide member 54 such that the upper slide member 52 can move axially through the intermediate guide member 54. The biasing member 56 is disposed between the inner platform 78 of the base 50 and the upper disc portion 82 of the upper slide member 52.

As noted above, the low profile sensor assembly 44 also includes the intermediate guide member 54, which is substantially tubular so as to define an outer surface 56 and an inner surface 88. The diameter of the intermediate guide member 54 is smaller than the diameter of the bore 62 of the base guide 58 such that the intermediate guide member 54 can move axially through the bore 62.

The intermediate guide member 54 includes a lower flange 90 formed on its lower end, and the base 50 includes an upper flange 92 formed on the upper end of the base guide 58. In the embodiment shown, the lower flange 90 of the intermediate guide member 54 extends radially outward, and the upper flange 72 of the base 50 extends radially inward. The diameter of the lower flange 90 is larger than the diameter of the upper flange 92. As such, the intermediate guide member 54 can be positioned within the bore 62 of the base guide 58. As the lower flange 90 of the intermediate guide member 54 slides toward the upper flange 92, the upper flange 92 interferes with the lower flange 90, thereby inhibiting further upward movement of the intermediate guide member 54. Thus, the upper flange 92 on the base 50 and the lower flange 90 on the intermediate guide member 54 cooperate to define the limit of sliding movement of the intermediate guide member 54 away from the base 50.

While the upper flange 92 of the base 50 defines one limit of travel of the intermediate guide member 54, the outer step 76 of the base 50 defines the other limit of travel. As shown specifically in FIG. 4, the intermediate guide member 54 can move axially downward within the base 50 until the lower flange 90 of the intermediate guide member 54 contacts the outer step 76 of the base 50. Thus, the outer step 76 is adapted to accept the lower flange 90 of the intermediate guide member 54 when the intermediate guide member 54 moves toward the base 50, and it defines the axial limit of travel of the intermediate guide member 54 toward the base 50. It is noted that since the outer step 76 is formed at a lower level than the inner platform 78 of the base 50, the intermediate guide member 54 has a greater range of motion in the axial direction. As such, the sensor assembly 44 has a lower profile than other sensors known in the related art and can collapse into a more compact arrangement, thereby making the sensor assembly 44 less likely to detrimentally affect the comfort of the vehicle seat 10.

In the preferred embodiment, the base 50 defines an inner guide surface 94. The inner guide surface 94 is formed on the inner surface of the wall 60 of the base guide 58, and it has a diameter slightly larger than the diameter of the lower flange 90 of the intermediate guide member 54. The inner guide surface 94 substantially guides the lower flange 90 as it slides within the base 50, such that the intermediate guide member 54 slides in a substantially axial direction. Thus, the lower flange 90 of the intermediate guide member 54 cooperates with the inner guide surface 94 of the base 50 to facilitate movement of the intermediate guide member 54 relative to the base 50 in a substantially axial direction. By guiding the intermediate guide member 54 in a substantially axial direction, the sensor 46 is adapted to generate more accurate readings as will be described in greater detail below.

The upper slide member 52 includes a lower flange 96 formed on its lower end. On the other hand, the intermediate guide member 54 includes an upper flange 98 formed on its upper end. In the embodiment shown, the lower flange 96 of the upper slide member 52 extends radially outward, and the upper flange 98 of the intermediate guide member 54 extends radially inward. The diameter of the lower flange 96 is larger than the diameter of the upper flange 98. As such, the upper slide member 52 can be positioned within the intermediate guide member 54. As the lower flange 96 of the upper slide member 52 slides toward the upper flange 98 under the influence of the biasing force generated by the biasing member 56, the upper flange 98 interferes with the lower flange 96, thereby inhibiting further upward movement of the upper slide member 52. Thus, the upper flange 98 on the intermediate guide member 54 and the lower flange 96 on the upper slide member 52 cooperate to define the limit of sliding movement of the upper slide member 52 away from the base 50.

While the upper flange 98 of the intermediate guide member 54 defines one limit of travel of the upper slide member 52, the inner platform 78 on the retainer 68 of the base 50 defines the other limit of travel. As shown specifically in FIG. 4, the upper slide member 52 can move in the direction of the base 52 in response to the presence of an occupant of the seat assembly 10 and against the biasing force of the biasing member 50 until the lower flange 96 of the upper slide member 52 contacts the inner platform 78 of the base 50. Thus, the inner platform 78 is adapted to accept the lower flange 96 of the upper slide member 52 when the upper slide member 52 moves toward the base 50, and it defines the axial limit of travel of the upper slide member 52 toward the base 50.

Also, in the preferred embodiment, the intermediate guide member 54 defines an inner guide surface 100. The inner guide surface 100 is formed on the inner surface 88 of the intermediate guide member 54, and it has a diameter slightly larger than the diameter of the lower flange 96 of the upper slide member 52. The inner guide surface 100 substantially guides the lower flange 96 as it slides within the intermediate guide member 54, such that the upper slide member 52 slides in a substantially axial direction. Thus, the lower flange 96 of the upper slide member 52 cooperates with the inner guide surface 100 of the intermediate guide member 54 to facilitate movement of the upper slide member 52 relative to the intermediate guide member 54 in a substantially axial direction. By guiding the upper slide member 52 in a substantially axial direction, the sensor 46 is adapted to generate more accurate readings as will be described in greater detail below.

Furthermore, the upper slide member 52 includes a retainer 102 extending in the general direction of the base 50. In the embodiment shown, the retainer 102 is cup-shaped and extends from the center of the upper disc portion 52 of the upper slide member 52 in the direction of the base 50 so as to be axially aligned with the sensor 46. In the embodiment shown in FIGS. 3 and 4, an emitter 104, such as a magnet, is operatively contained in and supported by the retainer 102.

Additionally, the base 50 defines a receptacle 106 formed along the axial center of the base 50 so as to be aligned with the retainer 102. As shown specifically in FIG. 4, the receptacle 106 is adapted to receive the retainer 102 when the upper slide member 52 has moved toward the base 50. Since the retainer 102 is able to fit within the receptacle 106, the upper slide member 52 can move further downward within the base 50, allowing the low profile sensor assembly 44 to collapse into a more compact arrangement. Advantageously, the low profile sensor assembly 44 is less likely to detrimentally affect the comfort of the vehicle seat 10.

In the embodiment shown here, the biasing member 56 is a coiled spring partially disposed about the ring 80 of the base 50 as well as about the retainer of the upper slide member 52. As noted above, the biasing member 56 is adapted to bias the upper slide member 52 and the intermediate guide member 54 away from the base 50 until the lower flanges 90, 96 contact the corresponding upper flanges 92, 98, respectively. However, while the biasing member 56 disclosed herein is a coiled spring, those having ordinary skill in the art will appreciate that any suitable biasing member may be employed to bias the upper slide member 52 and, in turn, the intermediate guide member 54 away from the base 50.

Thus, the weight of an occupant will deform the seat cushion 16 such that the lower surface 20 of the lower seat cushion 16 pushes the upper slide member 52 toward the base 50. As the upper slide member 52 moves, the sensor 46 detects an increase in magnetic flux density generated by the approaching emitter 104. In this way, the sensor 46 is operable to detect movement of the upper slide member 52 toward and away from the base 50. In turn, the sensor 46 generates a responsive signal indicative of the increase in flux density, and the controller 40 sends output to the restraint system 42 based on these signals. As stated, the guide surfaces 94, 100 direct the intermediate guide member 54 and the upper slide member 52 in a substantially axial direction. As such, an emitter 104 maintains a constant direction of travel relative to the sensor 56, thereby inhibiting the sensor 56 from obtaining false readings.

Those having ordinary skill in the art will appreciate that the sensor 56 could be fixed to the upper guide member 52 and the emitter 104 could be fixed under the base 50 without departing from the spirit of the invention. In other words, the sensor 56 may be operatively fixed relative to at least one of the upper slide member 52 and the base 50 such that the sensor 56 detects movement of the upper slide member 52 toward and away from the base 50.

Importantly, several features of the low profile sensor assembly 44 allow it to collapse in a more compact manner. Specifically, the outer step 76 of the base 50 allows the intermediate guide member 54 to travel lower into the base 50, and the receptacle 106 in the base 50 allows the retainer 102 and thus the upper slide member 52 to move further into the base 50 for increased collapsibility. Furthermore, the intermediate guide member 54 allows the upper slide member 52 to move substantially within the base 50. These features allow the fully compressed height of the low profile sensor assembly 44 to be relatively small. For instance, in one embodiment, the fully extended height of the sensor assembly 44 is 17 mm and the fully-compressed height is approximately 10 mm. Advantageously, because it can be made more compact, the low profile sensor assembly 44 is less likely to detrimentally affect the comfort of the vehicle seat 10.

While the sensor assembly 44 illustrated in FIGS. 2–4 provides a low profile and improved collapsibility while employing a single intermediate guide member 54, those having ordinary skill in the art will appreciate that the present invention is not limited to a single intermediate guide member 54. Rather, those having ordinary skill in the art will appreciate that the low profile sensor assembly 44 of the present invention may include more than one intermediate guide member 54 as a means of further reducing the profile of the low profile sensor assembly 44.

Figure 5:
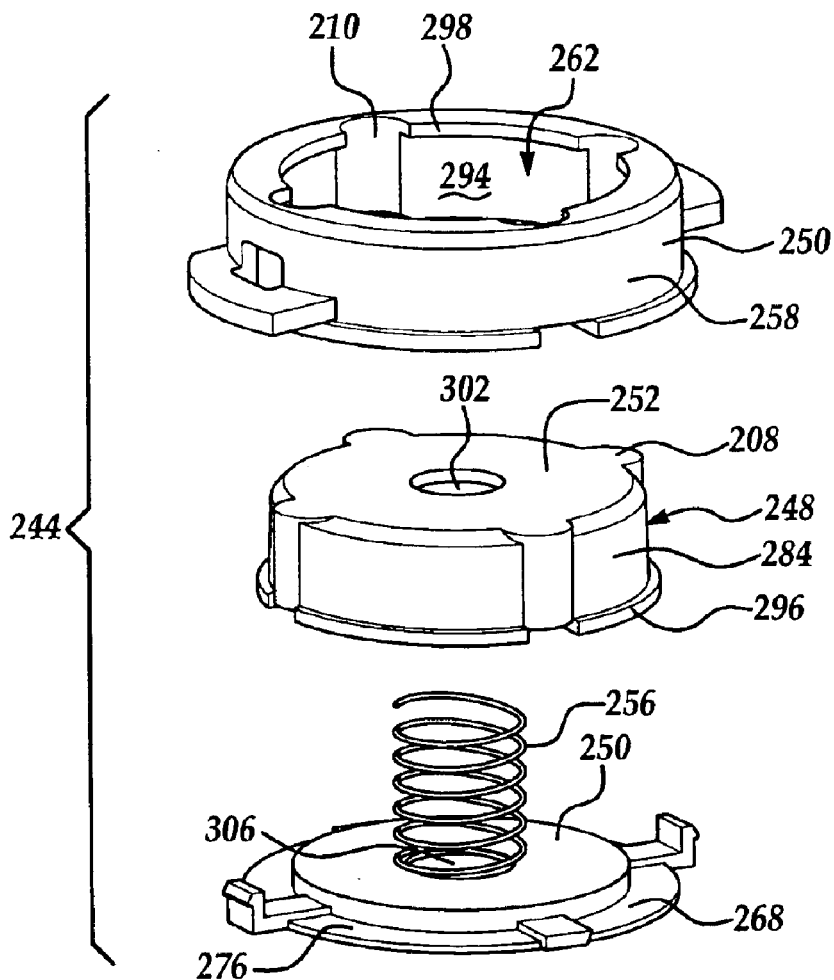
FIG. 5 is an exploded view of another embodiment of the low profile sensor assembly suitable for use in the vehicle occupant sensing system illustrated in FIG. 1.
Figure 6:
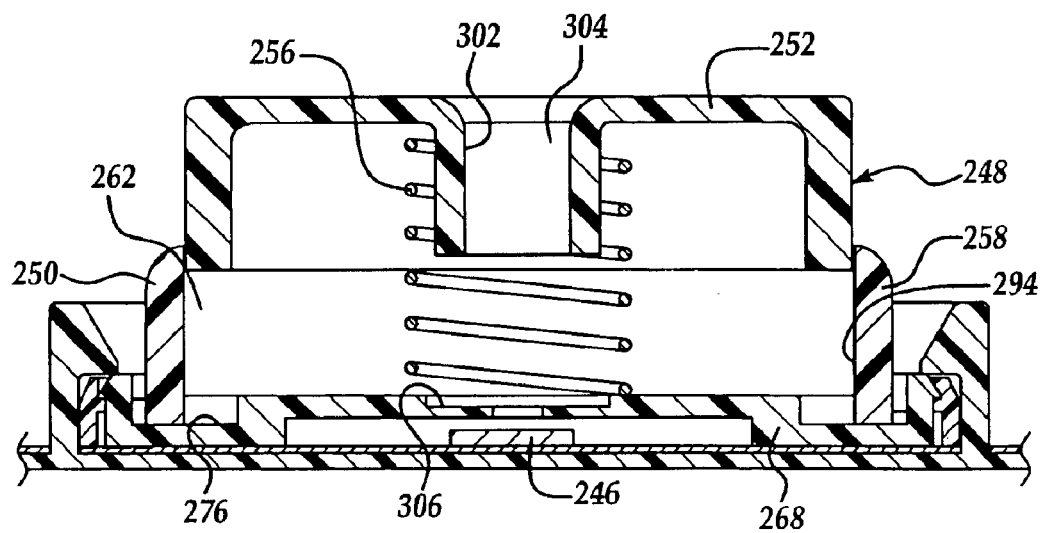
FIG. 6 is a cross-sectional side view of the low profile sensor assembly of FIG. 5 shown in a free state.
Figure 7:
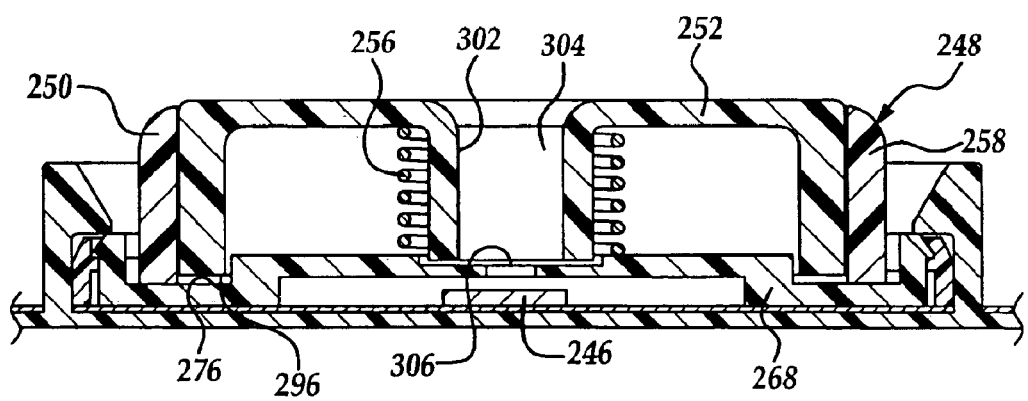
FIG. 7 is a cross-sectional side view of the low profile sensor assembly of FIG. 5 shown in a compressed state.

Turning now to FIGS. 5 through 7, a second embodiment of a low profile sensor assembly is generally indicated at 244 where like numerals increased by 200 are used to designate like structure with respect to the embodiment illustrated in FIGS. 2 through 4. The sensor assembly 244 can be included in the vehicle seat assembly 10 of FIG. 1.

As shown, the low profile sensor assembly 244 comprises a housing 248. The housing 248 includes a base 250 having an attached base guide 258 and a retainer 268. The low profile sensor assembly 244 also includes an upper slide member 252 supported for movement toward and away from the base 250. Specifically, the upper slide member 252 is sized to slidably move in an axial direction through a bore 262 of the base 250. The sensor assembly 244 also includes a biasing member 256 extending between the base 250 and the upper slide member 252. As in the preferred embodiment illustrated in FIG. 1–4, the biasing member 256 employed in the embodiment illustrated in FIG. 5–7 is a coiled spring. The spring biases the upper slide member 252 away from the base 250. Furthermore, the upper slide member 252 includes a lower flange 296 extending radially outward, and the base 250 includes an upper flange 298 extending radially inward such that contact between the lower flange 296 and the upper flange 298 limits the sliding axial movement of the upper slide member 252 within the base 250. The upper slide member 252 includes a retainer 302 extending downwardly toward the base 250.

Also, in the preferred embodiment, the base 250 defines an inner guide surface 294. The inner guide surface 294 is formed on the inner surface of the base guide 258, and it has a diameter slightly larger than the diameter of the lower flange 296 of the upper slide member 252. The inner guide surface 294 substantially guides the lower flange 296 as it slides within the base 250, such that the upper slide member 252 slides in a substantially axial direction. Thus, the lower flange 296 of the upper guide member 252 cooperates with the inner guide surface 294 of the base 250 to facilitate movement of the upper slide member 252 relative to the base 250 in a substantially axial direction.

Additionally, as seen specifically in FIG. 5, the upper slide member 136 includes a support wall 284 with a plurality of ridges 208 extending radially outward therefrom. In the embodiment shown, there are four ridges 208, each spaced 90° apart from one another. The base 250 has a corresponding number of spaced grooves 210 located on the inner guide surface 294. The grooves 210 are adapted to receive the ridges 208 such that the ridges 208 slide axially within the grooves 210, thereby inhibiting rotation of the upper slide member 252 relative to the base 250 about the axis of the base 250. The sensor assembly 244 includes a sensor 246 and emitter 304 of the type illustrated in the embodiment of FIGS. 2 through 5. By inhibiting this type of rotation, the ridges 208 and grooves 210 allow the sensor 246 to function more consistently and accurately. It can be appreciated by one having ordinary skill in the art that the ridges 208 could be included on the base 250 while the grooves 210 could be included on the upper slide member 252 without departing from the spirit of the invention.

Moreover, the low profile sensor assembly 244 includes an outer step 276, which is adapted to accept the upper slide member 252 when the upper slide member 252 moves toward the base 250. Specifically, the outer step 276 is included on the retainer 268 of the base 250 and is axially aligned with the lower flange 296 of the upper guide member 252. As shown in FIG. 7, the lower flange 296 can move into the space defined by the outer step 276 when the upper slide member 252 moves toward the base 250.

The low profile sensor assembly 244 also includes a receptacle 306 positioned at the axial center of the retainer 268 and aligned with the retainer 302 of the upper slide member 252. As such, when the upper slide member 252 moves toward the base 250, the retainer 302 can move into the receptacle 306.

Thus, the outer step 276 and the receptacle 306 each allow the upper slide member 252 to move further into the base 250, thereby allowing the low profile sensor assembly 244 to collapse to a smaller height. In this way, the low profile sensor assembly 244 is less likely to detrimentally affect the comfort level of the seat 10.

In summary, several features allow the low profile sensor assemblies 44, 244 to collapse to a lower height. Namely, the intermediate guide member 54, the outer step 76, 276, and the receptacle 106, 306, each allow the upper slide member 52, 252 to slide farther into the base 50, 250 for increased collapsibility. As such, when the sensor assemblies 44, 244 are incorporated into a vehicle seat assembly 10, the vehicle occupant is less likely to feel the sensor assemblies 44, 244 through the seat cushion 16. Thus, the low profile sensor assemblies 44, 244 are less likely to detrimentally affect the comfort level of the vehicle seat 10 with which it is incorporated.

In addition, the structure of the sensor assemblies of the present invention facilitate primarily axial movement of the relevant components of the sensor assembly 44, 244 in response to a load on the seat cushion 16. In this way, the sensor assemblies 44, 244 of the present invention are not adversely influenced by shear forces that may also be generated when an occupant is supported by the seat cushion 16.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A vehicle seat assembly comprising:

a lower seat cushion defining an upper surface and a lower surface spaced from said upper surface;

a vehicle occupant sensing system having a plurality of low profile sensor assemblies, each of said low profile sensor assemblies disposed below said lower seat cushion adjacent said lower surface, said low profile sensor assemblies each including a housing having a base, an upper slide member, and at least one intermediate guide member disposed between said upper slide member and said base, said upper slide member and said at least one intermediate guide member supported for movement toward and into said base and away from said base, and are responsive to movement of said upper surface of said lower seat cushion toward said lower surface of said seat cushion thereby responding to the presence of an occupant in said vehicle seat; and a sensor operatively fixed relative to at least one of said upper slide member and said base and operable to detect movement of said upper slide member toward and away from said base in response to the presence of an occupant in said vehicle seat.

2. A vehicle seat assembly as set forth in claim 1 wherein said at least one intermediate guide member includes a lower flange and said base includes an upper flange, said upper flange on said base and said lower flange on said at least one intermediate guide member cooperating to define the limit of movement of said at least one intermediate guide member away from said base.

3. A vehicle seat assembly as set forth in claim 1 wherein said upper slide member includes a lower flange and said at least one intermediate guide member includes an upper flange, said upper flange of said at least one intermediate guide member and said lower flange of said upper slide member cooperating to define the limit of movement of said upper slide member away from said base.

4. A vehicle seat assembly as set forth in claim 1 wherein said at least one intermediate guide member includes a lower flange and said base includes an outer step which is adapted to accept said lower flange of said at least one intermediate guide member when said at least one intermediate guide member moves toward said base.

5. A vehicle seat assembly as set forth in claim 1 wherein said upper slide member includes a retainer and said base includes a receptacle adapted to accept said retainer of said upper slide member when said upper slide member moves toward said base.

* * * * *